Figure 1:
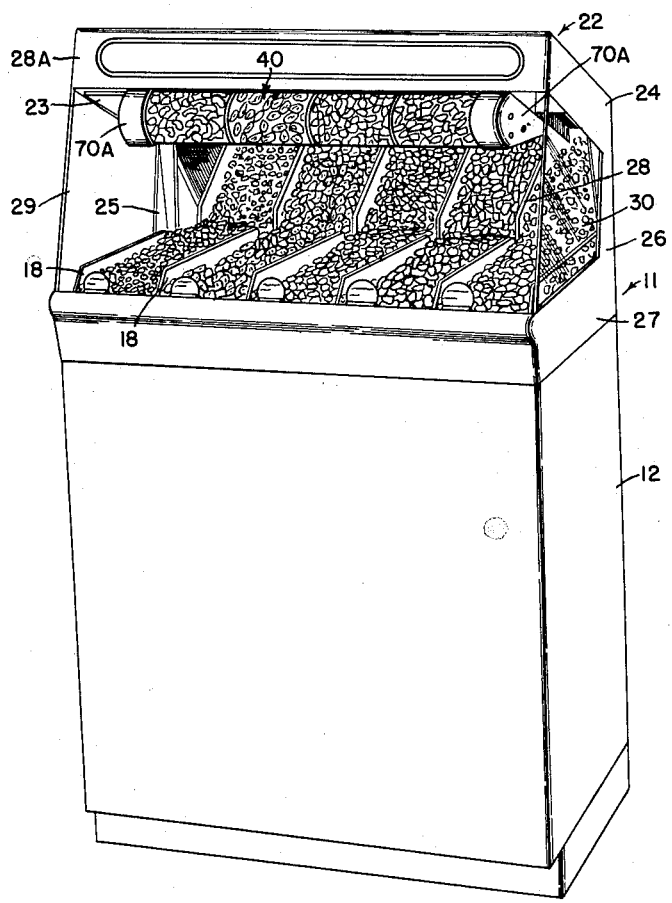

Nov. 10, 1964  E. F. KEMP ETAL  3,156,417
SHOW CASES
Original Filed July 21, 1953  4 Sheets-Sheet 1

INVENTORS
Edward F. Kemp
BY Ellsworth G. Nichols

Albert J. Kramer
ATTORNEY

Nov. 10, 1964  E. F. KEMP ETAL  3,156,417
SHOW CASES

Original Filed July 21, 1953  4 Sheets-Sheet 2

INVENTORS
Edward F. Kemp
BY  Ellsworth G. Nichols

ATTORNEY

Nov. 10, 1964   E. F. KEMP ETAL   3,156,417
SHOW CASES
Original Filed July 21, 1953   4 Sheets-Sheet 3
FIG. 4.
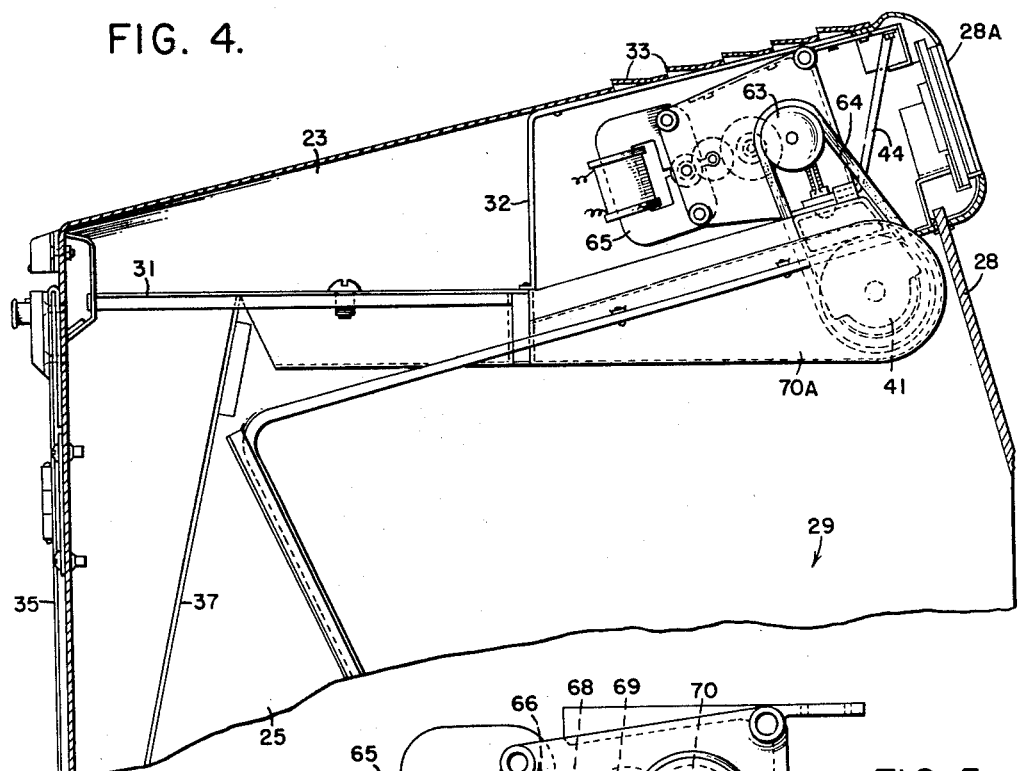
FIG. 5.
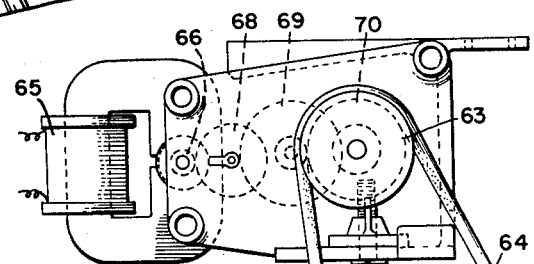
FIG. 7.
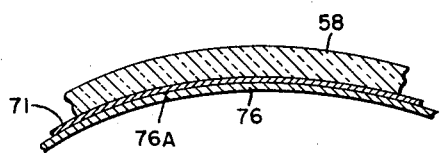
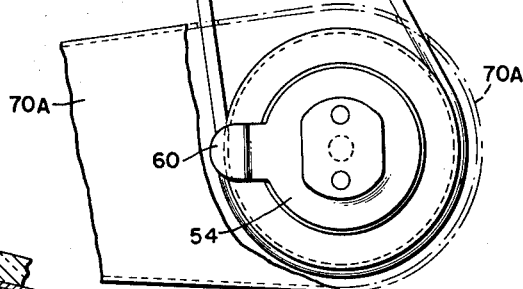
INVENTORS
Edward F. Kemp
Ellsworth G. Nichols
BY
Albert J. Kramer
ATTORNEY Nov. 10, 1964    E. F. KEMP ETAL    3,156,417
SHOW CASES
Original Filed July 21, 1953    4 Sheets-Sheet 4
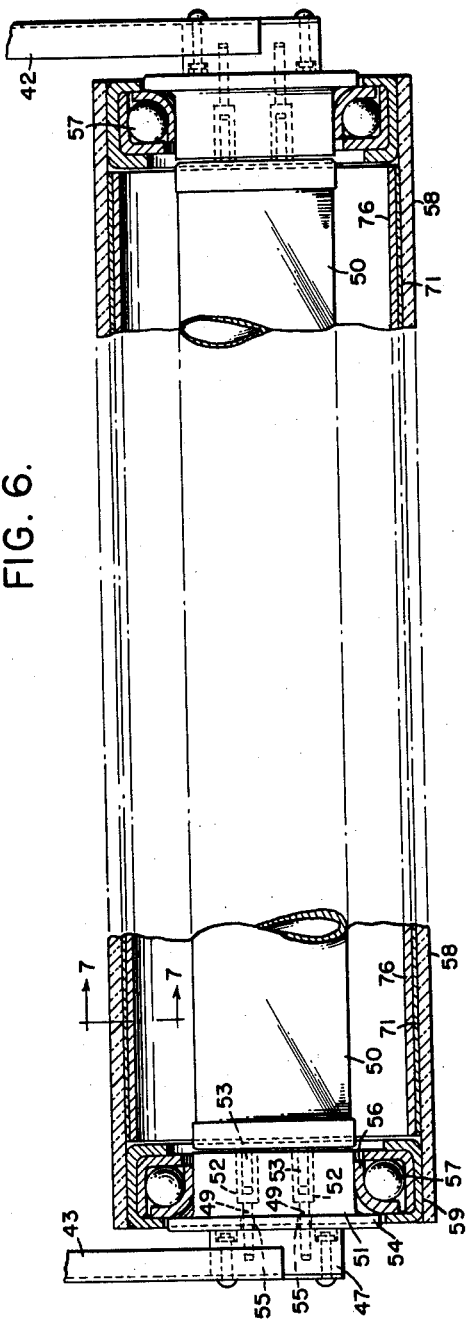
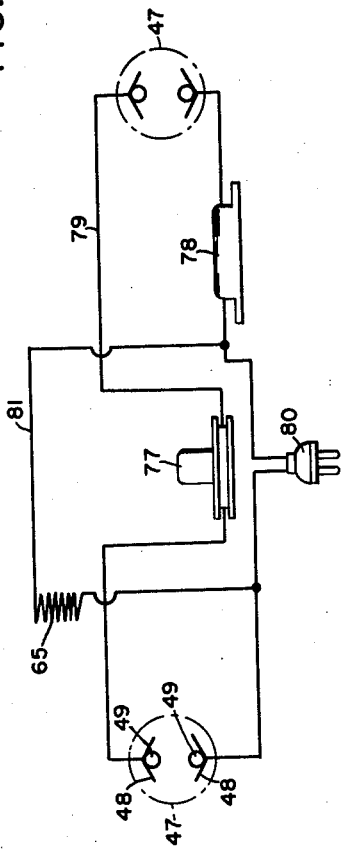
INVENTORS
Edward F. Kemp
BY Ellsworth G. Nichols
*Albert J. Kramer*
ATTORNEY united States Patent Office 3,156,417
Patented Nov. 10, 1964

3,156,417
SHOW CASES
Edward F. Kemp, Carlisle, and Ellsworth G. Nichols, Winchester, Mass. (both of 100 Walnut St., Somerville 43, Mass.)
Application Sept. 5, 1956, Ser. No. 608,089 which is a division of application Ser. No. 369,446, July 21, 1953, now Patent No. 2,776,179, dated Jan. 1, 1957. Divided and this application Oct. 19, 1961, Ser. No. 146,375
2 Claims. (Cl. 240—10.1)

This is a division of our copending application for patent Serial No. 608,089, filed September 5, 1956 which is a division of application Serial No. 369,446, filed July 21, 1953, now Patent No. 2,776,179, and the invention hereinafter described relates to display cabinets or show cases.

The invention is especially useful in merchandising commodities of particulate size, although its usefulness is not limited thereto, and has an important application in connection with the merchandising of nuts, including whole nuts and nut kernels or nut meats, which are customarily sold in retail stores, such as drug stores, department stores, grocery stores, and others. In this field of application, different kinds of nuts are usually sold, such as Brazil nuts, peanuts, almonds, cashews, filberts, pecans, and mixtures thereof. Show cases for the merchandising of such products ordinarily are provided with a plurality of horizontal bins for separately holding the different kinds of nuts offered for sale and from which the nuts are sold.

One of the problems involved in connection with such show cases is the provision of means for making the display attractive to a prospective customer in the vicinity of the show case. Nuts placed in the horizontal bins do not, in and of themselves, have much sales appeal. In the horizontal position only a relatively small area of the displayed nuts can be seen from a distance, this area being dominated and overshadowed by the over-all size of the cabinet, particularly the top portion wherein the nuts are located. Accordingly, one of the objects of the invention is to reverse the customary dominant effect of the cabinet relative to the nuts, by providing means wherein the displayed nuts appear to dominate the show case in a revealing or exposed manner.

Another object of the invention is to further increase the sales appeal and attractiveness of the items displayed by providing an animated device which blends with the displayed merchandise when viewed by a person in the vicinity of the show case.

A further object of the invention is the provision of means for removably mounting said animated device as a unit on the interior of the cabinet in such a way that the show case may be used either with or without the unit at will.

A still further object of the invention is the provision of such a show case having facilities which simplify the selling of the merchandise therefrom by a salesperson without departing from its overall attractiveness.

These and other objects and advantages of the invention will be apparent from the following description considered together with the accompanying drawing.

Figure 3:
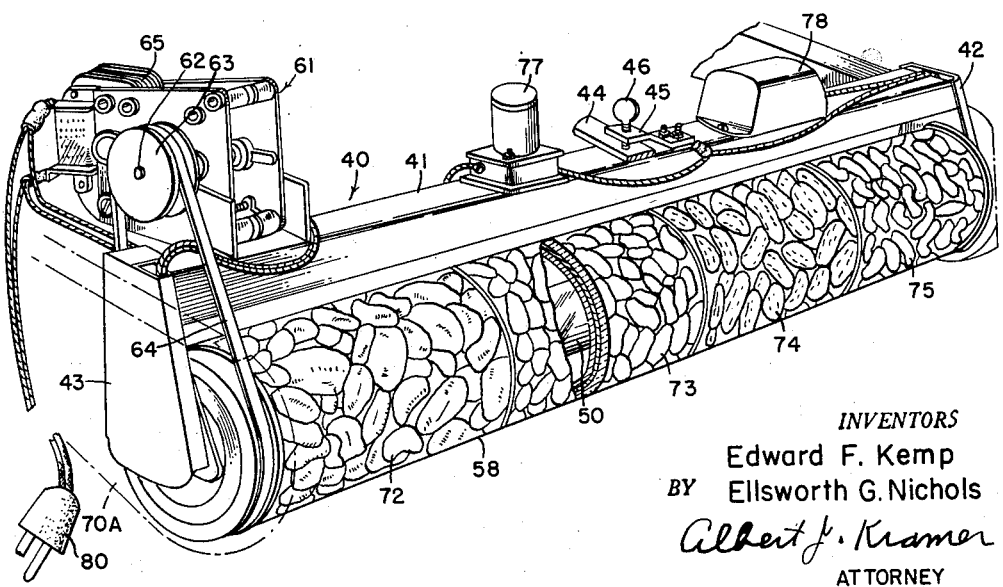
Figure 2:
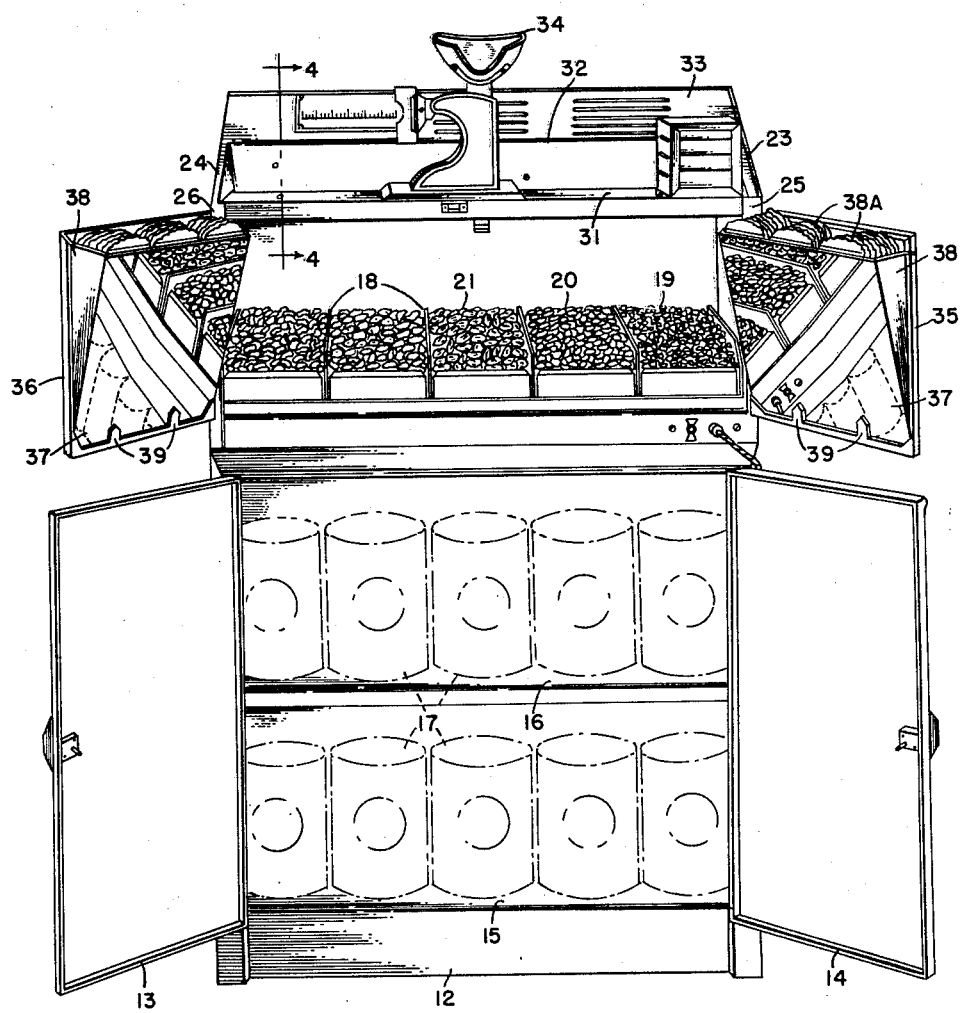

In the drawing:
FIGURE 1 is a front perspective view of the show case incorporating the features of this invention.
FIGURE 2 is a rear elevational view of the cabinet with the door in open position.
FIGURE 3 is a perspective view of the demountable rotary unit.
FIGURE 4 is a section along the line 4—4 of FIGURE 2.
FIGURE 5 is an end view of the rotary unit.
FIGURE 6 is a longitudinal sectional view taken through the cylinder of the rotary unit.
FIGURE 7 is a fragmentary sectional view along the line 7—7 of FIGURE 6.
FIGURE 8 is a schematic wiring diagram showing the relationship among the principal electrical elements of the device.

Referring with more particularity to the drawing in which like numerals designate like parts, the embodiment illustrated comprises a show case, generally designated by the numeral 11, mounted on a floor or base cabinet 12. The base cabinet may be of any suitable construction, and preferably has doors 13 and 14 for gaining access to the interior and shelves 15 and 16 for holding reserve packages 17 of the merchandise displayed in and sold from the show case 11.

The show case is preferably designed ornamentally along the lines of Design Patent No. 168,987. However, it is to be understood that the invention described and claimed herein is not limited to the use of such ornamental features and may be used with show cases having different ornamental features.

The floor of the show case 11 is provided with a plurality of partitions 18 extending from front to rear and spaced apart in the longitudinal direction from one side to the other to provide a plurality of bins for separately holding the various kinds of nuts. For example, the nuts 19 in one bin may be pecans, the nuts 20 in another bin may be cashews, the nuts 21 in the third bin may be almonds, etc.

The top 22 of the show case has side members 23 and 24 which slope generally from the front downwardly to the rear and are supported in cantilever fashion by vertical side frame members 25 and 26 at the rear, said vertical side frame members being integral with the top side members 23 and 24 and with the bottom frame member 27, thereby providing a full unobstructed view of the interior of the show case from the front and from either side thereof. A panel 28 of glass, Lucite, Plexiglass, or other suitable transparent material is set in the front of the show case between the front frame member 28A at the top and the bottom frame member 27. Similar panels 29 and 30 are provided at the sides between the bottom frame member and the top side frame members 23 and 24 adjacent the vertical frame members 25 and 26.

Between the sloping top side frame members 23 and 24, a horizontal shelf 31 is longitudinally disposed at the rear. A vertical panel 32 extends inwardly from the forward side of the shelf to the upper edge of the frame members 23 and 24 and a sloping top panel 33 is disposed at the front in the space defined by the upper edges of the frame members 23, 24, 28A and panel 32, substantially as shown.

The shelf 31 thus provided is for the convenience of the salesperson in making sales and may be used to support a weighing scale 34 and bags or boxes while they are being filled with products purchased.

The rear of the show case is provided with a pair of complementary doors 35 and 36, preferably horizontally swung to maintain them in a vertical position. These doors are each hinged to one of the vertical side frame members 25 and 26, respectively, and when closed fill completely the open area between said members.

Each door is provided with a sloping member 37 which extends upwardly and forwardly from the bottom and is secured in the sloping position on side plates 38. The forward faces of the members 37 are highly polished or mirrored to provide efficient light reflection. While this may be done by securing glass mirrors thereto, in practice, satisfactory results have been obtained by making the members 37 of stainless steel and buffing the surfaces to a high polish.

The slope of the mirror surfaces of the members 37 is at an angle such that when the doors are closed, the bins and any articles therein on the floor of the show case, will be reflected and the virtual image will appear to an observer in front of the cabinet as sloping upwardly and rearwardly, as illustrated in FIGURE 1, thus suggesting a continuity of the real bins and the real objects therein with the virtual images thereof. In this position, the virtual images of the bins are suggestive of chutes for feeding articles into the bins. To produce this effect, the slope of the member 37 should be at an acute angle with the vertical, less than 45°. The horizontal angle of the virtual image will be twice the angle between the mirrored surface and the vertical. Accordingly, having a virtual image of 20° to 45°, the vertical angle of the mirrored surface should be 10° to 22½°, respectively, the preferred being 25° and requiring a vertical angle of 12½°. The wedge-shaped space between the member 37 and their corresponding doors serves also as a pocket for storing folded paper bags 38 for use in packaging the merchandise sold from the show case. At the bottom edge of the members 37 openings 39 are cut out below the level of the merchandise in the bins. These openings serve to facilitate cleaning out any accumulation of particles in the pockets, such as grains of salt, chips of nut kernels, etc., such as might accidently fall therein during the transfer of nuts from the show case to the bags.

Within the show case, there is also mounted a rotary unit, generally designated by the numeral 40. This rotary unit comprises a longitudinal supporting beam 41 or other equivalent supporting structure at the ends of which are arms 42 and 43. The unit may be removably supported on a horizontal bracket arm 44 within the upper part of the show case, by means of a clamp consisting of a vertically offset arm 45 secured to the top of the beam and a set screw 46 carried by the arm 45. However, any other suitable means for securing the unit in the cabinet may be used, such as screws, or bolts passing through the top of the show case, and threadedly engaging any stationary part or parts of the unit.

Each arm 42 and 43 has fixed in position on its inner side near its outer end, a socket 47 of porcelain, glass, or other suitable electrical insulating material. Each socket is provided with a pair of oppositely disposed angular spring contacts 48, 48 which cooperate with supplemental terminals 49, 49. Said terminals are connected with the opposite ends of one of the starting filaments of a fluorescent lamp 50. Each pair of terminals 49, 49 is molded within a cylindrical hub or block 51 of an insulating material, such as bakelite or any of the well known synthetic resins having electrical insulating properties, and the outer end of each terminal is shaped to form a socket 52 for receiving within it one of the terminals 53 of the lamps 50.

On the exterior of each hub 51, there is provided a disc 54 of an electrical insulating material, such as bakelite or other suitable synthetic resin. The hub is formed with two apertures 55, 55, through which the terminals 49, 49 extend into the socket 47 to cooperate with the two angular spring contacts 48, 48. These discs are of larger diameter than the hubs 51 and for ease in assembling and disassembling the parts, one of them may, if desired, be integral with its corresponding hub or block so that it constitutes or provides an integral radial flange for the hub.

The two discs 54 serve to hold in position on their corresponding hubs the inner races 56 of ball bearings 57 disposed at the opposite ends of a hollow cylinder 58. The outer race of each ball bearing assembly is snugly fitted within a race cage annulus 59 which, in turn, is snugly fitted within the adjacent end of the cylinder 58. Said cylinder is fabricated of a rigid transparent material, such as glass, Lucite, Plexiglas, or other suitable material.

Each disc 54 is provided with a radially projecting handle or lever 60 by means of which it, the hub 51 and the lamp 50 may be manually adjusted rotationally to the extent of about 90° for starting and stopping the operation of the lamp.

Secured to the top of the beam 41 is a speed reducing power-transmitting mechanism 61 whose take-off shaft 62 is provided with a pulley 63. An endless belt 64 passes around the pulley 63 and also the cylinder 58 with which it is frictionally engaged.

An electric motor 65 is fixed in position between the side walls of the mechanism 61 and its armature shaft carries a pinion 66 which drives shaft 62 through a train of gears 68, 69, and 70. Thus, the motor 65, transmission 61, belt 64, beam 41, arms 42 and 43, cylinder 58 and the lamp 50, together with the elements associated with the latter, comprise the self contained unit 40 which can be incorporated in the show case or removed therefrom at will.

The unit 40, when mounted in position on the bracket 44 occupies a position at the upper front of the cabinet. In this position the cylinder 58 will have as its background the virtual images referred to above and the actual merchandise displayed in the bins. The arms 42 and 43 are covered with shields 70A inwardly flanged at the front and bottom to bridge and conceal from view the space between them and the cylinder.

The cylinder 58 is provided interiorly with a lining 71 of a translucent sheet material, such as paper, which bears upon its outermost side, pictures or illustrations of merchandise displayed in the bins, such as nut kernels, preferably in their natural colors. As illustrated in the drawing, each kind of nut is separately grouped in contiguous individual zones or sections 72, 73, 74 and 75, spacially arranged longitudinally of the cylinder, substantially as shown. In practice, the lining has been fabricated from several pieces or sections of such sheet material, each sheet having printed upon its outermost face a kind of nut kernel that is different from those depicted upon the other pieces or sections.

When the fluorescent tube is operating, it brilliantly illuminates the lining which is attractive in and of itself. This attractiveness, however, is enhanced by the background of the images reflected by the mirrored surfaces of the members 37 and is still further enhanced by the rotation of the cylinder. The rotating motion of the cylinder and the pictured nut kernels suggests a cascading effect and tends to induce the suggestion of relative motion in the background of displayed or reflected nut kernels. The situation thus created exercises the mental powers of perception and imagination and thus attracts the attention of prospective customers in the vicinity thereof. The motion of the cylinder, especially when illuminated, provides a sense of warmth and animation to the display as a whole. The combination dominates the show case per se and elevates the display from a sort of dormant or inert object to one of glowing vitality and exuberance.

To retain the lining in position within the tublar member 58, a retaining member 76 is provided and it comprises a sheet of transparent celluloid, isinglass, or other suitable resiliently flexible and transparent sheet material which is rolled into cylindrical form with its opposite ends abutting, as shown at 76A in FIGURE 7. When in position, the retainer, being resilient and tending to expand, presses the lining 71 against the inside surface of the wall of the cylinder 58 and thus holds it snugly in place.

A starter switch 77 and a ballast instrument 78, as commonly used with fluorescent lamps, are arranged in series in an electrical circuit 79, together with the contacts of sockets 47, and this circuit may include a connector plug 80 for connection to a source of electric current (not shown), while the coil of motor 65 is arranged in a parallel circuit 81 leading directly to the terminals of the plug 80. The starter switch 77 and ballast instrument 78 are preferably fixed, as shown, directly to the beam 41 or frame structure of the unit 40 to form a part thereof. However, it is entirely within the scope of this invention to mount them separately. Moreover, if desired, the rotary cylinder 58, together with its fluorescent lamp 50, hubs 51 and the supporting arms 42 and 43 may be mounted by attaching the said arms directly to upper frame members of the show case. Also, the motor 65 and speed reduction mechanism with pulley 63 may be independently attached to the top of the show case.

Having thus described our invention, we claim:

1. An electrical display device comprising a longitudinal beam, arms carried by the beam, a hollow transparent cylinder between the arms, a light tube within the cylinder, said tube having electrical terminal prongs extending outwardly at the end thereof, a hub at either end of the tube, electrical sockets carried by the hub for receiving said prongs, corresponding prongs connected to and extending from said sockets, means carried by said arms for receiving and supporting said corresponding prongs and for connecting them to a source of electric current, means for rotatably supporting said cylinder on said hub, an electric motor carried by the beam, a pulley connected to and driven by the motor, and a belt engaging said pulley and the periphery of the cylinder.

2. A self-contained unit for an electrical display device, said unit comprising a longitudinal support beam, arms carried by the beam at the ends thereof and extending transversely therefrom cantileverwise, a hollow transparent cylinder between the arms parallel to the beam, a light tube axially disposed within the cylinder, said tube having electrical terminal prongs extending outwardly at the end thereof, a hub at either end of the tube, electrical sockets carried by the hub for receiving said prongs, corresponding electrical prongs connected to and extending from said sockets on the opposite side of the hub, means carried by said arms for receiving and supporting said corresponding prongs and for connecting them to a source of electric current, means for rotatably supporting said cylinder on said hub, an electric motor secured to and carried by the beam on the side thereof oppoiste the cylinder, a pulley connected to and driven by the motor, and a belt engaging said pulley and the periphery of the cylinder.

References Cited in the file of this patent

UNITED STATES PATENTS

| | | |
|---|---|---|
| 1,631,785 | Barnett | June 7, 1927 |
| 1,661,592 | Wright | Mar. 6, 1928 |
| 1,803,597 | Craig | May 5, 1931 |
| 2,046,948 | Hill | July 7, 1936 |
| 2,279,341 | Powell | Apr. 14, 1942 |
| 2,293,106 | Bourdakoff | Aug. 18, 1942 |
| 2,559,159 | Hruby | July 3, 1951 |
| 2,645,868 | Ernst | July 21, 1953 |

FOREIGN PATENTS

| | | |
|---|---|---|
| 735,594 | France | Aug. 30, 1932 |